Patented Jan. 19, 1932

1,841,458

UNITED STATES PATENT OFFICE

CARL TAUBE, OF LEVERKUSEN-ON-THE-RHINE, AND HANS KÜKENTHAL, OF OPLADEN, GERMANY, ASSIGNORS TO WINTHROP CHEMICAL COMPANY, INC., OF NEW YORK, N. Y., A CORPORATION OF NEW YORK

AROMATIC THIOCYANATES SUITABLE FOR COMBATING INSECT PESTS

No Drawing. Application filed November 6, 1929, Serial No. 405,276, and in Germany November 26, 1928.

The present invention relates to new aromatic thiocyanates suitable for combating insect pests and to a process for preparing same.

The new compounds of the probable general formula:

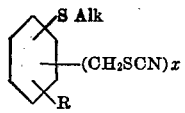

wherein Alk stands for an alkyl radicle, $x$ for 1 or 2 and R for hydrogen, halogen or an alkyl radicle, are prepared by heating a thioether with formaldehyde-hydrochloric acid to about 50–60° C. whereby the respective chloro-methyl-thioether is formed and by reacting upon the latter with a thiocyanate in alcoholic solution by heating to about 50–80° C. The reactions take place according to the equations:

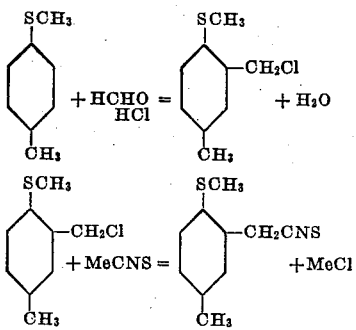

The new compounds are colorless crystalline substances, insoluble in water, soluble in the usual organic solvents, such as methyl and ethyl alcohol, chloroform, acetone, benzine, ether, and the like.

The new compounds are valuable insecticides. They may be used as insecticides per se or dissolved in appropriate solvents or in conjunction with emulsifying and wetting agents in watery suspension in the colloidal state and also in admixture with other insecticides. The lowest efficacious percentage of the substances in question is 0.010%. The mode of application of the watery emulsions is by spraying the plants being infected by insect pests. For combating flies, gnats and mosquitos solutions of the new insecticides in petroleum fractions are sprayed in the rooms.

Our invention is illustrated by the following examples without being limited thereto:

Example 1.—0.4 parts by weight of 1-methylthio-4-methyl-2-thiocyan-methylbenzene, prepared from the corresponding halogen compound by decomposition with ammonium thiocyanate in alcoholic solution, melting point 55° C., are dissolved in 2 parts by weight of acetone to which a wetting agent soluble in acetone is added, and the solution is diluted with water to 100 parts by weight.

The following table is given to demonstrate the efficacy of this compound to plant lice (aphis) on green plants:

| Percentage of efficient substance | Efficacy to plant lice on green leaves controlled on third day |
|---|---|
| 0.15 | Complete destruction without injury to the leaves. |
| 0.012 | Complete destruction without injury to the leaves. |
| 0.045 | Complete destruction without injury to the leaves. |
| 0.125 | Complete destruction without injury to the leaves. |
| 0.25 | Complete destruction without injury to the leaves. |

Therefore the solution kills the leaf lice already at a concentration of 0.015% of efficient substance while nicotine does not reach the same action but in about 0.06% concentration under otherwise same conditions.

Example 2.—0.25 parts by weight of 1-methylthio-4-thiocyanate-methyl-benzene, prepared in an analogous manner from the corresponding halogen compound with ammonium thiocyanate in an alcoholic solution as described in Example 1, are dissolved in 1 part by weight of acetone to which a wetting agent soluble in acetone is added, and the solution is diluted with water to 100 parts by weight. This solution already kills plant lice on leaves at the concentration mentioned in the following table:

| Percentage of efficient substance | Efficacy to plant lice on green leaves controlled on third day |
|---|---|
| 0.025 | Complete destruction without injury to the leaves. |

| Percentage of efficient substance | Efficacy to plant lice on green leaves controlled on third day |
|---|---|
| 0.02 | Complete destruction without injury to the leaves. |

*Example 3.* — 1 - methylthio - 4 - chloro - methyl-benzene, obtainable from p-chloro-phenyl-thio-methyl-ether by condensation with formaldehyde-hydrochloric acid, is heated under reflux for one hour in a methyl-alcoholic solution with an excess of ammonium thiocyanate. On diluting with water the 1 - methylthio - 4 - chloro - 2 - thio - cyan-methyl-benzene precipitates in the form of a soon coagulating oil. When recrystallized from benzene it forms well shaped crystals showing the melting point 60° C.

The substance per se acts efficiently in a concentration of 0.5% on plant lice on cucumbers, when emulsified with the ammonium salt of isobutylnaphthalene sulfonic acid, it combats in a concentration of 0.125% plant lice on garden roses without injury to the leaves.

Other compounds which are accessible from phenyl-thio-ethers by condensation with formaldehyde-hydrochloric acid and exchange of the halogen by thiocyanate also act in a similar manner.

We claim:

1. In the process of preparing aromatic thiocyanates the step which comprises reacting upon a chloromethyl-benzene with ammonium thiocyanate at a temperature between 50 and 80° C.

2. In the process of preparing 1-methyl-thio-4-methyl-2-thiocyanmethyl benzene the step which comprises reacting upon 1-methyl-thio-4-methyl-2-chloro-methyl-benzene with ammonium-thiocyanate in ethyl-alcoholic solution at a temperature of 60-80° C.

3. The compounds of the probable general formula:

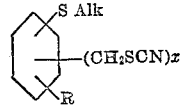

wherein Alk stands for an alkyl radicle, R for hydrogen, halogen or an alkyl radicle and *x* stands for 1 or 2, being colorless crystalline powders suitable as insecticide, insoluble in water and soluble in the usual organic solvents.

4. The compound of the probable formula:

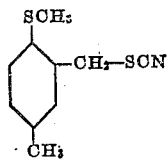

being a colorless crystalline powder suitable as insecticide, melting at 55° C., insoluble in water and soluble in the usual organic solvents.

In testimony whereof, we affix our signatures.

CARL TAUBE.
HANS KÜKENTHAL.